United States Patent [19]

Johnson

[11] 4,287,776
[45] Sep. 8, 1981

[54] FORCE TRANSDUCER

[76] Inventor: Clarence Johnson, 2922 Ash Dr., Springfield, Ohio 45504

[21] Appl. No.: 106,470

[22] Filed: Dec. 26, 1979

[51] Int. Cl.$^3$ .......................... G01L 1/14; G01L 1/26
[52] U.S. Cl. .............................. 73/862.52; 73/862.64
[58] Field of Search ............. 73/141 A; 177/169, 229; 267/151, 158, 160

[56] References Cited

U.S. PATENT DOCUMENTS

| | | | |
|---|---|---|---|
| 3,358,502 | 12/1967 | Johnson | 73/141 A |
| 3,443,653 | 5/1969 | Marshall | 177/169 X |
| 3,492,865 | 2/1970 | Johnson | 73/141 A |
| 4,071,104 | 1/1978 | Macari et al. | 177/229 |

*Primary Examiner*—Charles A. Ruehl
*Attorney, Agent, or Firm*—John F. Luhrs

[57] ABSTRACT

In a force transducer for producing an output signal proportional to the magnitude of a force applied to a force receiving platform cantilevered from a base through a compound flexure unit, comprising: (a) a C-shaped flexure having a thin, flexible middle section and opposed rigid outer sections engaging, respectively, the opposed surfaces of the platform and base and, (b) an auxiliary flexure spring system comprising parallel spaced apart leaf springs cantilevered, respectively, from the opposed rigid sections joined together at their free ends by a clamp adjustable to vary the effective length of the springs as required to calibrate the transducer to a predetermined force range.

5 Claims, 4 Drawing Figures

FORCE TRANSDUCER

This invention relates to a transducer generating an output signal corresponding to a force such as weight, axial thrust of a rotating shaft or to a physical condition or quantity, the magnitude of which can be translated into a proportional force, such as pressure, temperature, rate of fluid flow, the tension in a continuous strip of material or wire as it passes along a processing line.

Force transducers of the type to which this invention relates comprise, in general, a support base and a force receiving platform disposed in spaced apart parallel planes. The platform is cantilevered from the support base through a C-shaped flexure. A force applied normal to the platform produces a deflection of the platform from a null or no-load position in a clockwise or counter-clockwise direction about the flexure depending upon the sense and magnitude of the applied force. A control couple having relatively movable elements, such as, but not limited to, an LVDT (Linear Variable Differential Transformer), a capacitance bridge, a pilot valve, having one element connected to the platform and the other element supported from the base, generates an output signal proportional to the platform deflection from the null position and accordingly proportional to the magnitude of the applied force. The span of load ranges within which a transducer, as so far described, can be calibrated is materially limited. To obtain acceptable resolution and accuracy, while avoiding over-stressing of the C-shaped flexure, displacement of the platform at a maximum applied force F, must be constrained to be within predetermined limits usually in the order of 0.020 inches or less. To cover the span of force ranges found in industrial applications, as an order of magnitude extending from 5 to 150,000 pounds force, a multiplicity of C-shaped flexures must be available and the calibration of a specific C-shaped flexure to a designated force range obtained by adjusting the thickness of the flexure section of the C-shaped flexure.

U.S. Pat. No. 3,492,865 discloses a force transducer of the type described wherein the span of force ranges within which a transducer can be calibrated is materially expanded by the inclusion of spaced apart parallel leaf springs disposed in a plane between and parallel to the force receiving platform and base, cantilevered respectively from the platform and base, and joined together at their free ends by a clamp adjustable to vary their effective lengths.

In contrast to this and as a principle objective, this invention comprehends a force transducer wherein the span of force ranges within which the transducer can be calibrated is expanded by a compound flexure unit incorporating both the C-shaped flexure and an auxiliary flexure spring system.

It is a further objective of this invention to provide an auxiliary cantilever spring system of simple construction, requiring a minimum of parts.

It is a further objective of this invention to provide a force transducer of high accuracy and resolution, of compact design and suitable for installation in industrial plants such as steel mills, cement mills, paper mills wherein there is usually present a deleterious atmosphere containing a high degree of pollutants.

These and other objectives of this invention will be apparent as the description proceeds in connection with the drawings in which:

IN THE DRAWINGS

DETAILED DESCRIPTION

Figure 1:
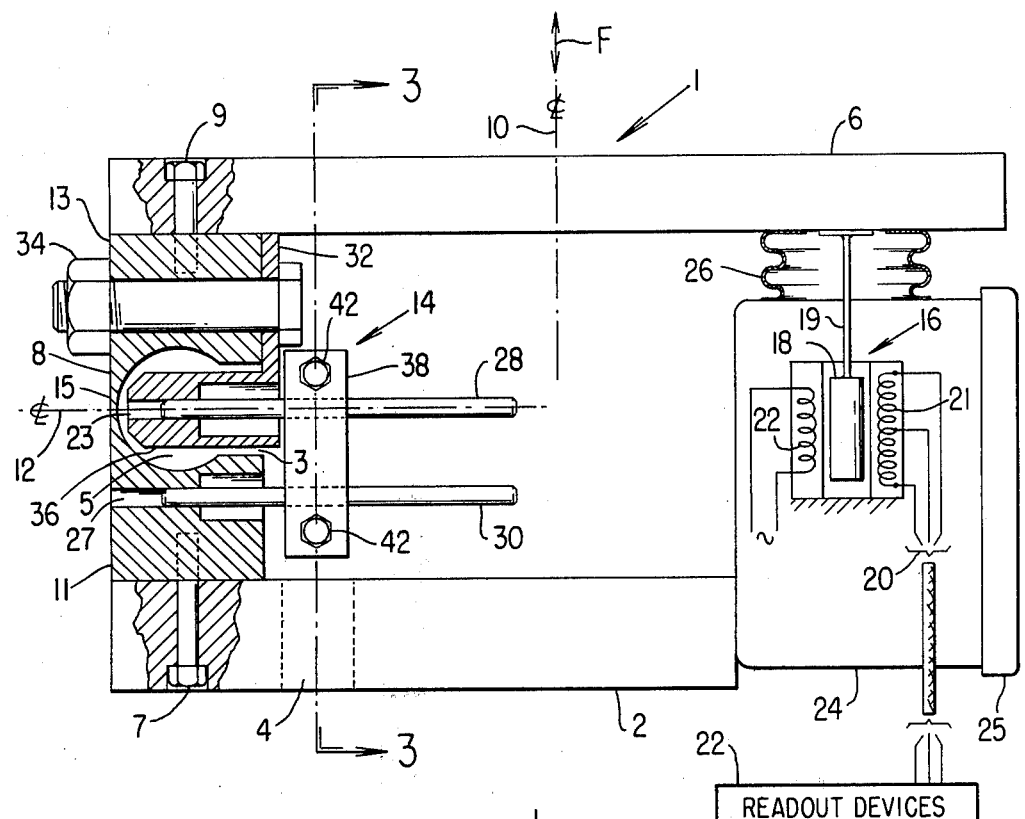
FIG. 1 is a partially sectioned side elevation of one embodiment of this invention.

Referring now to the drawings in which like reference characters designate like or corresponding parts throughout the several views there is shown a force transducer generally indicated at 1, comprising rigid rectangular base 2 provided with through bores 4 adapted to receive mounting fasteners (not shown) for securing the transducer in fixed operative position. Base 2 may be mounted in any position since the functioning parts of the transducer are operative regardless of the position in which the base 2 is mounted.

A rigid force receiving platform 6 is cantilevered from the base 2 through a compound flexure unit, generally indicated at 14. One element of the compound flexure unit 14 comprises a C-shaped flexure 8 secured to the base 2 and platform 6 by means of fasteners shown at 7 and 9 respectively. The flexure 8 is formed with a cylindrical transverse hole 5 extending through an intermediate portion and a slot 3 open radially into the hole to provide: (a) a relatively thin flexure section 15 in the side of the hole opposite the slot, and (b) opposed rigid sections 11 and 13 engaging, respectively, opposed surfaces of the base 2 and platform 6, being joined together solely through the flexure section 15. The other element of the compound flexure unit 14 comprises spaced apart parallel leaf springs 28 and 30 cantilevered, respectively, from the rigid sections 13 and 11, joined together at their free ends by a clamp 38 adjustable to vary the effective lengths of the springs.

In the null or no-load position, the platform 6 is preferably parallel to the base 2 and the longitudinal center line of the flexure spring 28 coincident with the transverse axis 12 of the flexure section 15. The spring flexure 28 is cantilevered from the rigid section 13 through a right angle support racket 32, detachably clamped to the rigid section 13, by means of one or more fasteners 34 and having a leg 36 extending through the slot 3 and protruding into the transverse hole 5. The leg 36 is provided with a recessed bore 23, the center-line of which is coincident with the transverse axis 12 and in which the flexure spring 28 is anchored. By having the leg 36 protrude into the transverse hole 5 the clamp 38 can be brought into close proximity to the anchor points of flexures 28 and 30 thereby maximizing the span of force ranges in which the transducer can be calibrated.

Figure 3:
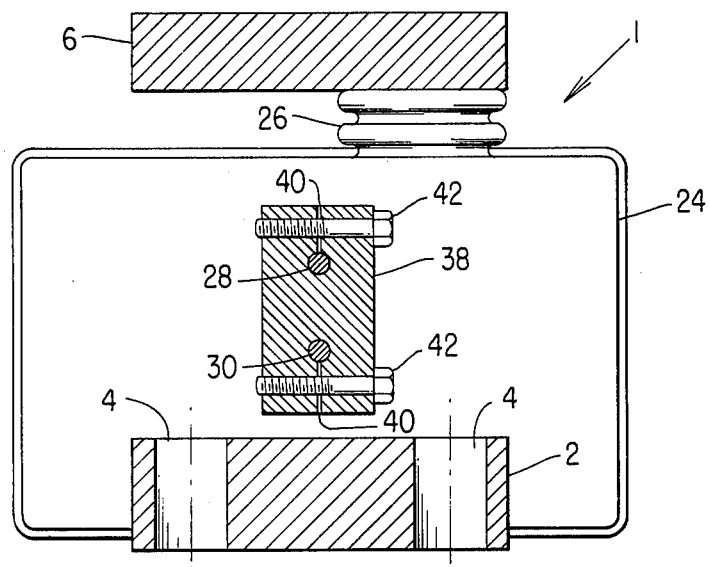
FIG. 3 is a cross-section view taken along the line 3—3 in the direction of the arrows in FIG. 1 or in FIG. 2.
Figure 4:
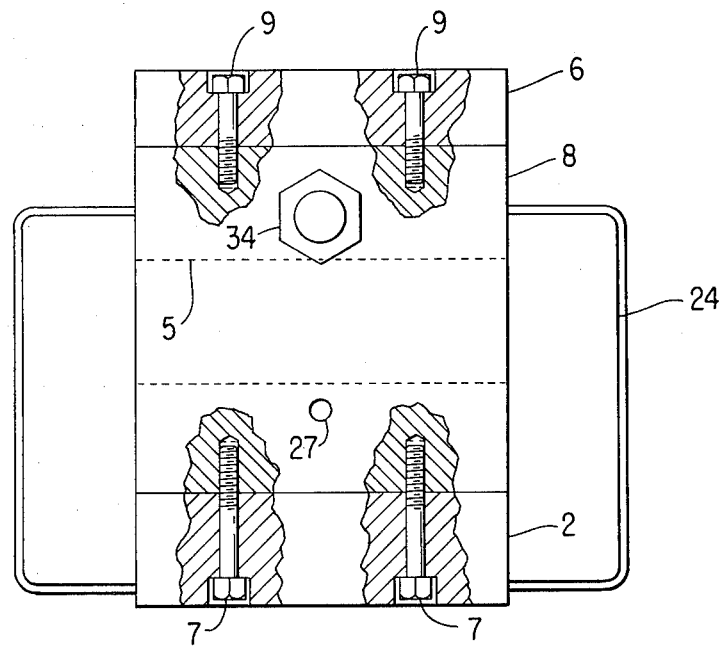
FIG. 4 is a left hand elevation view of the embodiment of the invention illustrated in FIG. 1 or in FIG. 2.

The rigid section 11 is provided with a recessed bore 27 in which the flexure spring 30 is anchored. The right hand or free ends of flexure springs 28 and 30 are joined together by a clamp 38 adjustable to vary the effective length of the flexures. Positioning of the clamp 38 toward the C-shaped flexure 8 will increase the resistance to flexing of the compound flexure unit 14 and vice versa. To facilitate adjustment and clamping along the flexures 28 and 30, as best shown in FIG. 3, the clamp 38 is provided with slots 40 and screws 42 which when drawn tight cause the clamp 38 to firmly grasp the flexures 28 and 30 and when loosened permit positioning of the clamp along the flexures.

Adjacent the end of the platform 6 remote from the compound flexure 8 is a control couple, having relatively movable elements, generally indicated at 16, generating an output signal, transmitted through leads 20 to a readout device 22 which may incorporate, for example, an indicator, recorder and/or controller. In the embodiment shown, the control couple 16 comprises a LVDT having an armature 18 operatively connected to the platform 6 through a suitable linkage, diagramatically shown as a rod 19, and stationary primary and differential secondary coils 21 and 22 supported directly or indirectly from the base 2. The control couple 16 and linkage 19 are contained in a conduit box 24 provided with a detachable gasketed cover plate 25. The conduit box 24, if required, can be made substantially impervious to atmospheric contaminates by the provision of a flexible bellows 26 sealing the opening through which linkage 19 extends to the platform 6. Linkage 19, the control couple 16 and conduit box 24 may be of substantially the same construction as shown in U.S. Pat. No. 3,358,502.

Figure 2:
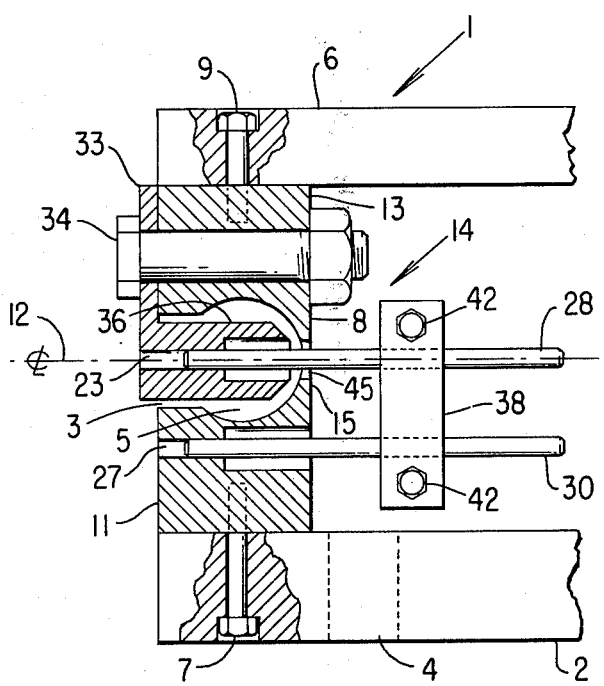
FIG. 2 is a partially sectioned fragmentary view of a modification of the embodiment of this invention illustrated in FIG. 1.

In FIG. 2 there is shown a modified form of the C-shaped flexure 8 turned 180° from the position shown in FIG. 1 and provided with a clearance hole 45 centered on the transverse axis 12 through which flexure spring 28 from its anchor point in the leg 36 of bracket 32 extends. To accomodate the configuration shown in FIG. 2, the recess in the leg 36 and rigid section 11, providing clearance for the flexing of flexures 28 and 30 have been reversed from that shown in FIG. 1. The modified form of the compound flexure unit 14, shown in FIG. 2, permits the clamp 38 to be positioned closer to the adjacent face of the C-shaped flexure spring 8, with consequent increase in the span of forced ranges within which the transducer can be calibrated.

A force F of given magnitude applied normal to the force receiving platform 6 along a reference center-line of loading 10 is balanced when the displacement of the platform 6 from the null position generates an equal and opposite force by the flexing elements of the compound flexure unit 14. By adjustment of the effective lengths of the springs 28 and 30 of the ratio between the magnitude of the applied force and resultant displacement of the platform 6 can be varied. The transducer can therefore be calibrated to produce a desired linear deflection of the force receiving platform, usually in the order of 0.020 inches or less, along the reference center-line of loading 10 for a maximum applied force selected from an infinite number contained within a span determined by the limits of adjustment of the effective lengths of flexure springs 28 and 30.

I claim:

1. In a transducer for generating an output signal corresponding to the magnitude of a force having a force receiving platform cantilevered from a base through a C-shaped flexure formed with a cylindrical transverse hole and a slot opening radially into the hole to form a thin flexible middle section and opposed rigid outer sections engaging, respectively, the opposed surfaces of the base and platform, an auxilliary spring having a first section cantilevered from said rigid section engaging the surface of said force receiving platform, the longitudinal center-line of which is coincident with the transverse axis of the middle section of said C-shaped flexure, and having a second section cantilevered from the other of said rigid sections, adjustable means coupling said sections whereby the effective length of said auxiliary spring can be varied to thereby adjust the displacement of said platform about the transverse axis of said middle section produced by a given applied force, and a control couple having relatively movable elements operatively connected to said base and platform respectively generating an output signal corresponding to the displacement of the platform from a null position.

2. In a transducer as set forth in claim 1 wherein said compound flexure unit includes a bracket secured to the one of said outer rigid sections engaging the surface of said force receiving platform extending through the slot into said transverse hole provided with a bore the longitudinal center-line of which is coincident with said transverse axis and said spring section is anchored in said bore and extends through said slot and said first and second spring sections are disposed in a common plane normal to the center-line of said cylindrical transverse hole.

3. In a transducer as set forth in claim 2 wherein each of said spring sections comprises a relatively long leaf spring having a round cross section.

4. In a transducer as set forth in claim 3 wherein said means coupling said spring sections comprises a clamp provided with slotted bore holes through which said spring sections pass and means for expanding and contracting said slots to thereby permit adjustment of said clamp along said spring sections and to securely clamp said sections in a selected position thereby defining the effective lengths of said spring sections.

5. In a transducer as set forth in claim 1 wherein the middle section of said C-shaped flexure is provided with a hole, the center of which is coincident with the transverse axis of said middle section, further including a bracket secured to the one of said outer rigid sections engaging the surface of said force receiving platform extending through the slot into said transverse hole provided with a bore hole the longitudinal axis of which is coincident with the transverse axis of said middle section and said first spring section is anchored in said bore hole and extends through the hole in the middle section of said C-shaped flexure.

* * * * *